Patented Oct. 6, 1931

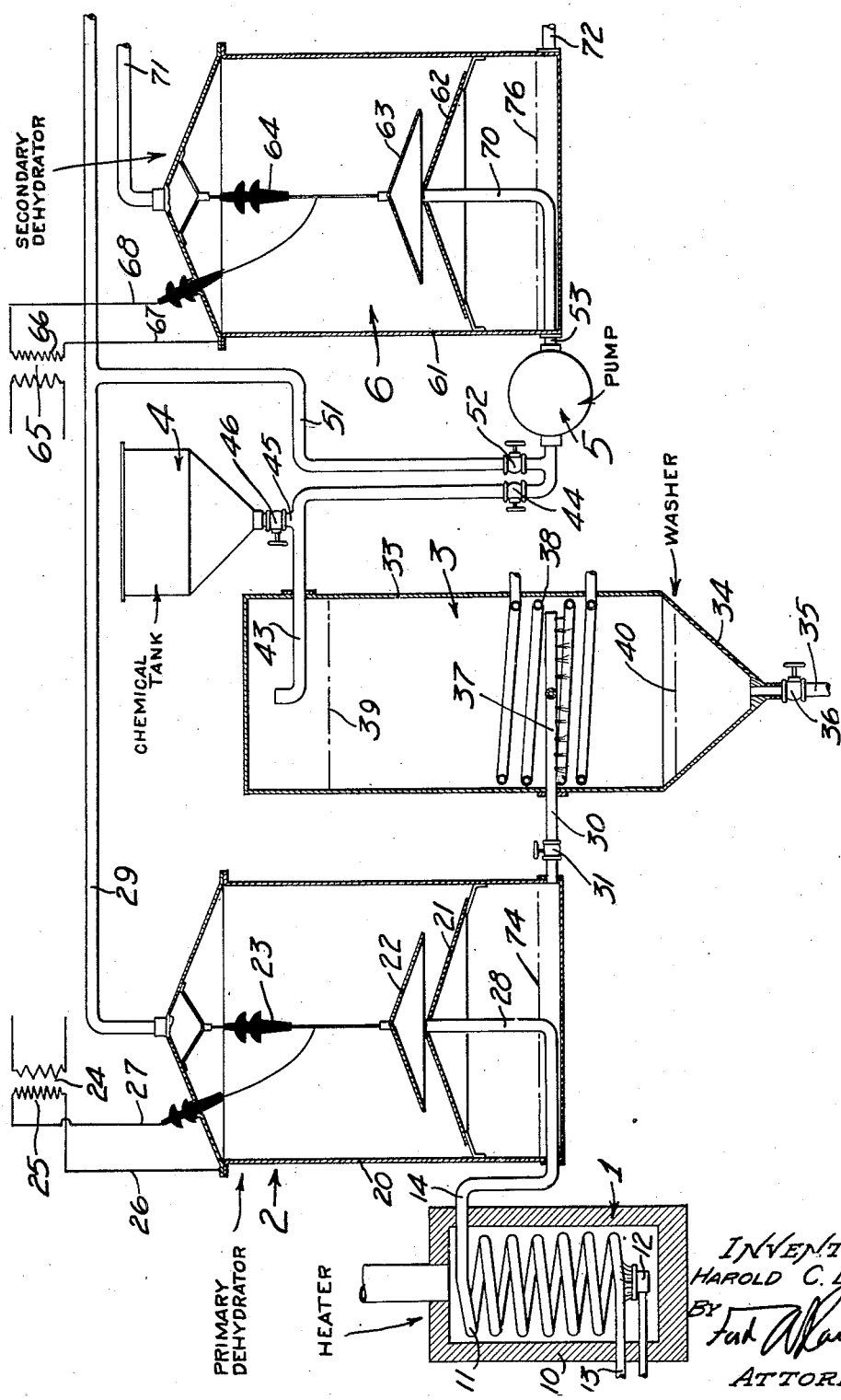

1,826,276

UNITED STATES PATENT OFFICE

HAROLD C. EDDY, OF LOS ANGELES, CALIFORNIA, ASSIGNOR TO PETROLEUM RECTIFYING COMPANY OF CALIFORNIA, OF LOS ANGELES, CALIFORNIA, A CORPORATION OF CALIFORNIA

METHOD OF SALVAGING OIL FROM SLUDGE

Application filed December 28, 1926. Serial No. 157,531.

This invention relates to the art of dehydrating petroleum emulsions and particularly to a process of dehydrating emulsions.

In this art it is common practice to dehydrate emulsified petroleum by passing the emulsion through a treating space in which an electric field has been established. The electric field coalesces the water particles so that they may separate from the oil by gravity. The emulsified petroleum often carries foreign matter such as sand, silt, mud, and the like. The dehydrating of the emulsified petroleum is usually carried on inside a tank and the sludge is usually withdrawn from the lower part of the tank, and the dry oil withdrawn from the upper end of the tank. The sludge carries a certain amount of oil which cannot be separated from it in this process of dehydration. The sludge because of the oil content is difficult to dispose of. It cannot be discharged into rivers, and it is necessary to let it stand in sumps.

It is an object of this invention to provide a process for dehydrating emulsified oil and recovering practically all of the oil from the emulsion.

I accomplish this object of the invention by treating the emulsified oil in substantially the same manner as is common practice, and, in addition to this, treating the sludge by a special process to recover any oil which remains therein. Others have endeavored to recover oil from sludge but to my knowledge none have been practically successful.

It is accordingly another object of this invention to provide a process for recovering oil from sludge.

Other objects and advantages of the invention will be made evident hereinafter.

In the drawing, I diagrammatically illustrate an apparatus adapted to carry on the process of the invention.

Referring in detail to this drawing, 1 is a heater, 2 is a primary dehydrator, 3 is a washer, 4 is a chemical tank, 5 is a pressure pump, and 6 is a secondary dehydrator.

The heater 1 consists of a shell 10 made from insulation material such as brick, which encloses a coil 11 through which emulsion may pass. In the lower part of the shell 10 is a heating burner 12. Emulsion is supplied to the coil 11 by means of a pipe 13 and is withdrawn from the coil 11 and delivered to the dehydrator 2 by means of a pipe 14.

The dehydrator 2 is of ordinary construction consisting of a tight shell 20 in which a grounded electrode 21 and a live electrode 22 are supported. The live electrode 22 is insulated from the tank 20 by means of an insulator 23, whereas the grounded electrode 21 is in electrical contact with the tank. A transformer 24 is provided for setting up an electric field between the electrodes 21 and 22. A secondary 25 of the transformer is connected to the tank 20 by a conductor 26 and to the live electrode 22 by means of a conductor 27. The emulsion pipe 14 is connected to a pipe 28 which is adapted to deliver the emulsion to the space between the electrodes 21 and 22. Dry oil is withdrawn from the upper end of the tank 20 by means of a dry oil pipe 29. Sludge consisting of foreign matter such as water, sand, silt, and the like, and oil is withdrawn from the lower part of the tank 20 by means of a pipe 30 having a valve 31. The pipe 30 conducts the sludge to the washer 3.

The washer 3 consists of a tight shell 33 having a conical bottom 34 to which a drain pipe 35 having a valve 36 is connected. The pipe 30 is connected to a cross-shaped discharge pipe 37 which is placed inside the shell 33 a distance below the center thereof. A heating coil 38 which may carry steam is placed in the shell 33 for the purpose of heating a body of water therein, which water occupies a space between broken lines 39 and 40. The space below the broken line 40 is filled with foreign matter which is separated from the oil or emulsion and is withdrawn through the drain pipe 35. The space above the broken line 39 is filled with a washed emulsion and oil which formed a part of the sludge. An oil take-off pipe 43 is extended into the upper part of the shell 33 for the purpose of withdrawing emulsion from the upper end of the tank. The pipe 43 has a valve 44 and is connected to the pump 5.

The chemical tank 4 is connected to the pipe 43 by means of a nipple 45 and is provided with a valve 46. The chemical tank 4 contains a suitable chemical or modifying agent which may be phenol, sulphonated fatty acids, sodium oleate, calcium oleate, or any other substance capable of modifying the interfacial tension between the emulsion particles. The emulsion which is delivered through the pipe 43 for the purpose of identification is called residue emulsion. It should be understood that this term is purely arbitrary. A branch line 51 is connected to the dry oil pipe 29 of the dehydrator 2 and to the pipe 43 between the valve 44 and the pump 5, this branch line 51 having a valve 52. The purpose of this line 51 is to permit a mixing of cleaned dry oil with the residue emulsion to assist its being dehydrated. The pump 5 is provided for the purpose of forcing residue emulsion through a pipe 53 to the secondary dehydrator 6.

The secondary dehydrator 6 may be of the same construction as the primary dehydrator 2. It consists of a shell 61 in which a grounded electrode 62 and a live electrode 63 are supported. The live electrode 63 is insulated from the shell 61 by means of an insulator 64, and the grounded electrode 62 is in electrical contact with the shell. An electric field is formed between the electrodes 62 and 63 by means of a transformer 65, a secondary 66 of which is connected to the shell 61 by means of a conductor 67 and to the live electrode 63 by means of a conductor 68. The pipe 53 is connected to a pipe 70 which delivers the residue emulsion to the treating space between the electrodes. Dry oil is withdrawn from the upper end of the shell 61 by means of a dry oil pipe 71 and water is withdrawn from the lower part of the shell 61 by means of a water drain pipe 72.

The operation of the apparatus and the process of this invention is as follows:

The emulsified petroleum is passed through the heater 4 and is raised in temperature sufficiently to facilitate the dehydration thereof. An electric field is established between the electrodes 21 and 22 of the primary dehydrator 2 by energizing the transformer 24. The hot emulsion is delivered through the pipe 14 and the pipe 28, to the treating space between these electrodes where it is subjected to the action of the electric field. The water particles are coalesced into masses of sufficient size to gravitate from the oil. These water masses and other foreign matter such as mud, sand and silt gravitate to the lower part of the shell 20, occupying a space below the broken line 74. The clean dry oil passes upward through the shell 20 and is withdrawn through the dry oil pipe 29. The sludge in the bottom of the primary dehydrator 2 is bled from the dehydrator through the pipe 30, the valve 31 being open to the proper extent, and is delivered to the cross-shaped discharge pipe 37 of the washer 3. The sludge is delivered in a downward direction into the body of hot water occupying the space between broken lines 39 and 40. The foreign matter of the sludge, being heaviest, readily falls to the bottom of the shell 33. The emulsion being lightest and being washed in the body of hot water is free to rise to the upper part of the shell 33.

The emulsified petroleum which I call the residue emulsion passes from the upper end of the shell 33 through the pipe 43. The valve 46 in the nipple 45 of the chemical tank 4 may be open if it is necessary to mix chemicals with the residue emulsion in order that it be successfully dehydrated. In treating some residue emulsions a chemical is not necessary, whereas in treating others it is vitally essential. The pump 5 operates to pull the residue emulsion through the pipe 43 and to deliver it into the secondary dehydrator 6. If necessary, dry oil from the primary dehydrator 2 may be mixed with the residue emulsion by opening the valve 52 in the branch line 51. In some cases this is essential and in others it is not. The residue emulsion passes through the pipe 70 of the secondary dehydrator 6 and into the treating space between the electrodes 62 and 63, in which treating space an electric field has been established by the operation of the transformer 65. The action in this treating space coalesces the water particles and they fall to the bottom of the shell 61, occupying a space below the broken line 76. The clean oil separated from the residue emulsion passes upward through the shell 61 and is withdrawn through the pipe 71.

In my invention emulsified petroleum is so treated that there is practically no loss of petroleum. The foreign matter consisting of mud and water and the like withdrawn from the washer 3 through the drain pipe 35, contains no oil, and the water withdrawn from the secondary dehydrator 6 through the pipe 72 contains no oil. It is possible, therefore, to dispose of the foreign matter and the water in a suitable manner, delivering it to a river or to a suitable sump.

The use of the chemical and of the dry oil which are mixed with the residue emulsion as intimated may be eliminated when treating certain kinds of residue emulsions. The purpose of the chemical and the reflux of the dry oil is to change the interfacial tension relation between the emulsion particles and to reduce short-circuiting tendencies of the residue emulsion to a minimum. The washing action which takes place in the washer 3 is very important to the invention since it permits the sludge to stratify into its component parts, the foreign matter precipitating to the bottom of the tank and the emulsion raising to the upper end of the tank.

It is necessary to use a separate dehydrator for dehydrating the residue emulsion because it is of a different electrical resistance from the first emulsion, and therefore requires a different setting of the electrodes or a different voltage in the secondary dehydrator. It is possible to adjust either the primary or secondary dehydrator without affecting the other of the dehydrators.

I claim as my invention:

1. A process of completely dehydrating emulsified oil and recovering substantially all the oil, comprising: subjecting an emulsion to the action of a primary electric field, thus dividing said emulsion into a clean oil and a sludge; washing said sludge to separate the residue emulsion and foreign matter; and subjecting said residue emulsion to the action of a secondary electric field to separate the oil and water of said residue emulsion, said secondary field being of different potential gradient from said primary field.

2. A process of completely dehydrating emulsified oil and recovering substantially all the oil, comprising: subjecting an emulsion to the action of a primary electric field, thus dividing said emulsion into a clean oil and a sludge; washing said sludge to separate the residue emulsion and foreign matter; mixing said residue emulsion with a modifying agent; and subjecting said residue emulsion to the action of a secondary electric field to separate the oil and water of said residue emulsion, said secondary field being of different potential gradient from said primary field.

3. A process of completely dehydrating emulsified oil and recovering substantially all the oil, comprising: heating an emulsion; subjecting said emulsion to the action of a primary electric field, thus dividing said emulsion into a clean oil and a sludge; washing said sludge to separate the residue emulsion and foreign matter; and subjecting said residue emulsion to the action of a secondary electric field to separate the oil and water of said residue emulsion, said secondary field being of different potential gradient from said primary field.

4. A process of completely dehydrating emulsified oil and recovering substantially all the oil, comprising: heating an emulsion; subjecting said emulsion to the action of a primary electric field, thus dividing said emulsion into a clean oil and a sludge; washing said sludge to separate the residue emulsion and foreign matter; mixing said residue emulsion with a modifying agent; and subjecting said residue emulsion to the action of a secondary electric field to separate the oil and water of said residue emulsion, said secondary field being of different potential gradient from said primary field.

5. A process of completely dehydrating mulsified oil and recovering substantially all the oil, comprising: subjecting an emulsion to the action of a primary electric field, thus dividing said emulsion into a clean oil and a sludge; washing said sludge in hot water to separate the residue emulsion and foreign matter; and subjecting said residue emulsion to the action of a secondary electric field to separate the oil and water of said residue emulsion, said secondary field being of different potential gradient from said primary field.

6. A process of completely dehydrating emulsified oil and recovering substantially all the oil, comprising: subjecting an emulsion to the action of a primary electric field, thus dividing said emulsion into a clean oil and a sludge; washing said sludge in hot water to separate the residue emulsion and foreign matter; mixing said residue emulsion with a modifying agent; and subjecting said residue emulsion to the action of a secondary electric field to separate the oil and water of said residue emulsion, said secondary field being of different potential gradient from said primary field.

7. A process of completely dehydrating emulsified oil and recovering substantially all the oil, comprising: heating an emulsion; subjecting said emulsion to the action of a primary electric field, thus dividing said emulsion into a clean oil and a sludge; washing said sludge in hot water to separate the residue emulsion and foreign matter; and subjecting said residue emulsion to the action of a secondary electric field to separate the oil and water of said residue emulsion, said secondary field being of different potential gradient from said primary field.

8. A process of completely dehydrating emulsified oil and recovering substantially all the oil, comprising: heating an emulsion; subjecting said emulsion to the action of a primary electric field, thus dividing said emulsion into a clean oil and a sludge; washing said sludge in hot water to separate the residue emulsion and foreign matter; mixing said residue emulsion with a modifying agent; and subjecting said residue emulsion to the action of a secondary electric field to separate the oil and water of said residue emulsion, said secondary field being of different potential gradient from said primary field.

9. A process of recovering oil from a sludge separated from an emulsion, comprising: washing said sludge to separate the residue emulsion and foreign matter; mixing said residue emulsion with a chemical modifying agent; and subjecting said residue emulsion to the action of an electric field to separate the oil and water of said residue emulsion.

10. A process of completely dehydrating emulsified oil and recovering substantially all the oil, comprising: subjecting an emulsion to the action of a primary electric field, thus dividing said emulsion into a clean oil and a sludge; projecting said sludge downward into a body of water whereby the foreign matter of said sludge drops below said body of water and the residue emulsion rises above said body of water; and subjecting said residue emulsion to the action of a secondary electric field to separate the oil and water of said residue emulsion, said secondary field being of different potential gradient from said primary field.

11. A process of completely dehydrating emulsified oil and recovering substantially all the oil, comprising: subjecting an emulsion to the action of a primary electric field, thus dividing said emulsion into a clean oil and a sludge; washing said sludge to separate the residue emulsion and foreign matter; mixing said residue emulsion with a quantity of dry oil; and subjecting said residue emulsion to the action of a secondary electric field to separate the oil and water of said residue emulsion.

12. A process of recovering oil from a sludge, which comprises: washing said sludge to form a residue emulsion; mixing said residue emulsion with a modifying agent and with dry oil; and subjecting the mixture to the action of an electric field to separate the phases of the residue emulsion.

13. A process of completely dehydrating emulsified oil and recovering substantially all of the oil, which comprises: separating from said emulsion dry oil and a residue emulsion; mixing said residue emulsion with a modifying agent and a quantity of dry oil; and subjecting the mixture to the action of an electric field to separate the phases of the residue emulsion.

14. A process of completely dehydrating an emulsion, which includes: electrically treating said emulsion in a primary electric field; removing sludge from the treated emulsion; removing foreign matter from said sludge so as to leave a residual emulsion; and electrically treating said residual emulsion in a secondary field spaced from said primary field.

In testimony whereof, I have hereunto set my hand at Los Angeles, California, this 23rd day of December, 1926.

HAROLD C. EDDY.